(12) United States Patent
Friedman

(10) Patent No.: US 7,997,989 B2
(45) Date of Patent: Aug. 16, 2011

(54) BALANCED DRIVESHAFT ASSEMBLY AND METHOD

(75) Inventor: Michael C Friedman, Lake Orion, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 312 days.

(21) Appl. No.: 12/403,681

(22) Filed: Mar. 13, 2009

(65) Prior Publication Data

US 2010/0234117 A1    Sep. 16, 2010

(51) Int. Cl.
*F16C 3/00* (2006.01)

(52) U.S. Cl. .......................... 464/180; 464/127

(58) Field of Classification Search .......... 464/127, 464/180; 188/378; 74/572.4; 73/66
See application file for complete search history.

(56) References Cited

U.S. PATENT DOCUMENTS

| | | |
|---|---|---|
| 4,614,506 A | 9/1986 | Sakata |
| 4,887,989 A | 12/1989 | Kerecman |
| 4,895,551 A | 1/1990 | Fritz |
| 5,722,896 A | 3/1998 | Beagley et al. |
| 5,778,737 A * | 7/1998 | Welsh et al. .................. 464/180 |
| 6,050,900 A | 4/2000 | Reinhardt et al. |
| 6,123,623 A | 9/2000 | Sugiyama |
| 6,334,568 B1 * | 1/2002 | Seeds ............................ 464/180 |
| 6,655,208 B1 | 12/2003 | McClanahan |
| 6,773,354 B2 | 8/2004 | Marriott et al. |
| 6,811,633 B1 | 11/2004 | Myers |
| 6,840,105 B2 | 1/2005 | Calkins et al. |
| 2004/0000214 A1 | 1/2004 | Williams |
| 2006/0219005 A1 | 10/2006 | Appling |
| 2006/0283678 A1 * | 12/2006 | Murakami .................... 464/180 |

* cited by examiner

*Primary Examiner* — Greg Binda
*Assistant Examiner* — Josh Skroupa
(74) *Attorney, Agent, or Firm* — Harness, Dickey & Pierce, P.L.C.

(57) ABSTRACT

A balanced driveshaft assembly that includes a driveshaft and a composite weight. The driveshaft has a shaft member and a pair of cardan joints that are coupled to the opposite ends of the shaft member. The shaft member is formed of a first material. The composite weight is fixed to the shaft member, and includes an insert and a body. The insert is formed of a second material that is denser than the first material and is encapsulated in the body. The body is formed of the first material. A composite weight and a method for forming a balanced driveshaft assembly are also provided.

21 Claims, 3 Drawing Sheets

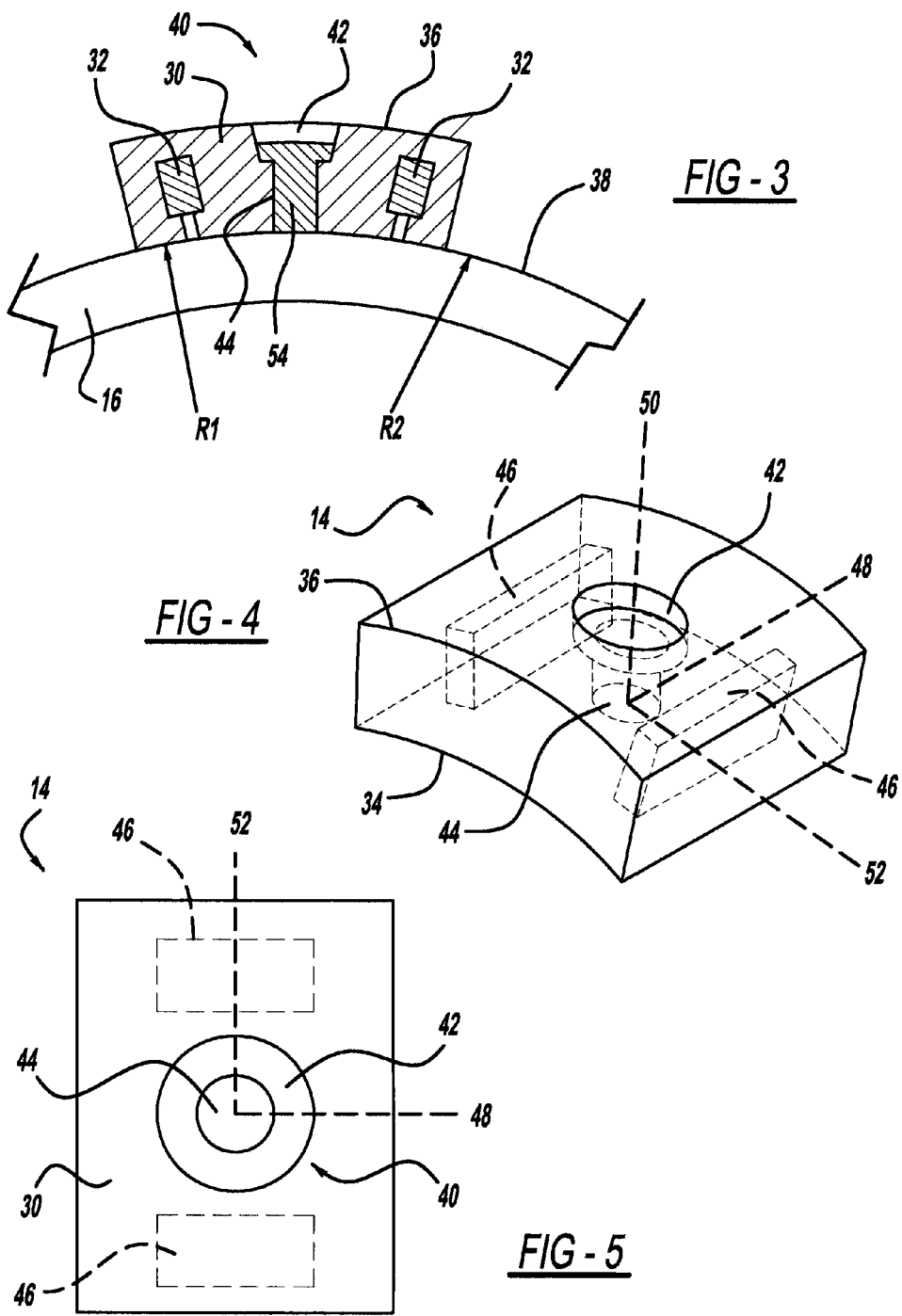

BALANCED DRIVESHAFT ASSEMBLY AND METHOD

INTRODUCTION

The present invention generally relates to a balanced driveshaft assembly and related method.

BACKGROUND

This section provides background information related to the present disclosure which is not necessarily prior art.

Driveshafts for automotive vehicles have shaft members that have historically been formed from steel. Due to dimensional variations that occur during the manufacturing process, driveshafts may exhibit an out-of-balance condition when rotated. Typically, steel balance weights or counter weights were welded to the shaft member of the driveshaft assembly to correct the out-of-balance condition. As needs and technologies changed, the shaft members of driveshafts began to be manufactured from aluminum. While steel counterweights continued to be used with the aluminum shaft members, it was relatively more difficult to secure the steel counterweight to the aluminum shaft member. The use of alternative materials other than steel for counterweights may require more material, bulkier forms and/or render the counterweight more susceptible to oxidation or corrosion.

Therefore, it is desirable to provide an improved counterweight.

SUMMARY

This section provides a general summary of some aspects of the present disclosure and is not a comprehensive listing or detailing of either the full scope of the disclosure or all of the features described therein.

In one form, the present teachings provide a composite weight for balancing a driveshaft that can have a tubular member that is defined by a first radius. The composite weight can include an insert and a body portion. The insert can be formed of a first material and can have a predetermined mass. The body portion can be formed of a second material that is different from the first material. The body portion can be molded over and can encase the insert. The body portion has a surface that is configured to abut the tubular member. The surface being at least partially defined by a second radius that is equal to or greater than the first radius. The first material has a density that is greater than a density of the second material.

In another form, the present teachings provide a balanced driveshaft assembly that includes a driveshaft and a composite weight. The driveshaft has a shaft member and a pair of cardan joints that are coupled to the opposite ends of the shaft member. The shaft member is formed of a first material. The composite weight is fixed to the shaft member, and includes an insert and a body. The insert is formed of a second material that is denser than the first material and is encapsulated in the body. The body is formed of the first material.

In yet another form, the present teachings provide a method for forming a balanced driveshaft. The method includes: providing an insert formed of a first material; forming a composite weight by molding a body over the insert, the body being formed of a second material and encasing the insert therein, the second material being less dense than the first material; providing a driveshaft having a tubular shaft member and a pair of cardan joints, each of the cardan joints being coupled to an opposite end of the tubular shaft; and fixing the composite weight to the tubular shaft member to reduce or eliminate a rotational out-of-balance condition in the driveshaft.

Further areas of applicability will become apparent from the description provided herein. It should be understood that the description and specific examples in this summary are intended for purposes of illustration only and are not intended to limit the scope of the present disclosure, its application and/or uses in any way.

BRIEF DESCRIPTION OF THE DRAWINGS

The drawings described herein are for illustrative purposes only and are not intended to limit the scope of the present disclosure in any way. The drawings are illustrative of selected teachings of the present disclosure and do not illustrate all possible implementations. Similar or identical elements are given consistent identifying numerals throughout the various figures.

FIG. 3 is a cross-section taken along the line 3-3 of FIG. 2;

FIG. 4 is a perspective view of a composite weight with plate inserts according to the present disclosure.

FIG. 5 is a top cross-section view of a composite weight with plate inserts according to the present disclosure.

DETAILED DESCRIPTION OF THE VARIOUS EMBODIMENTS

Figures 1, 2:
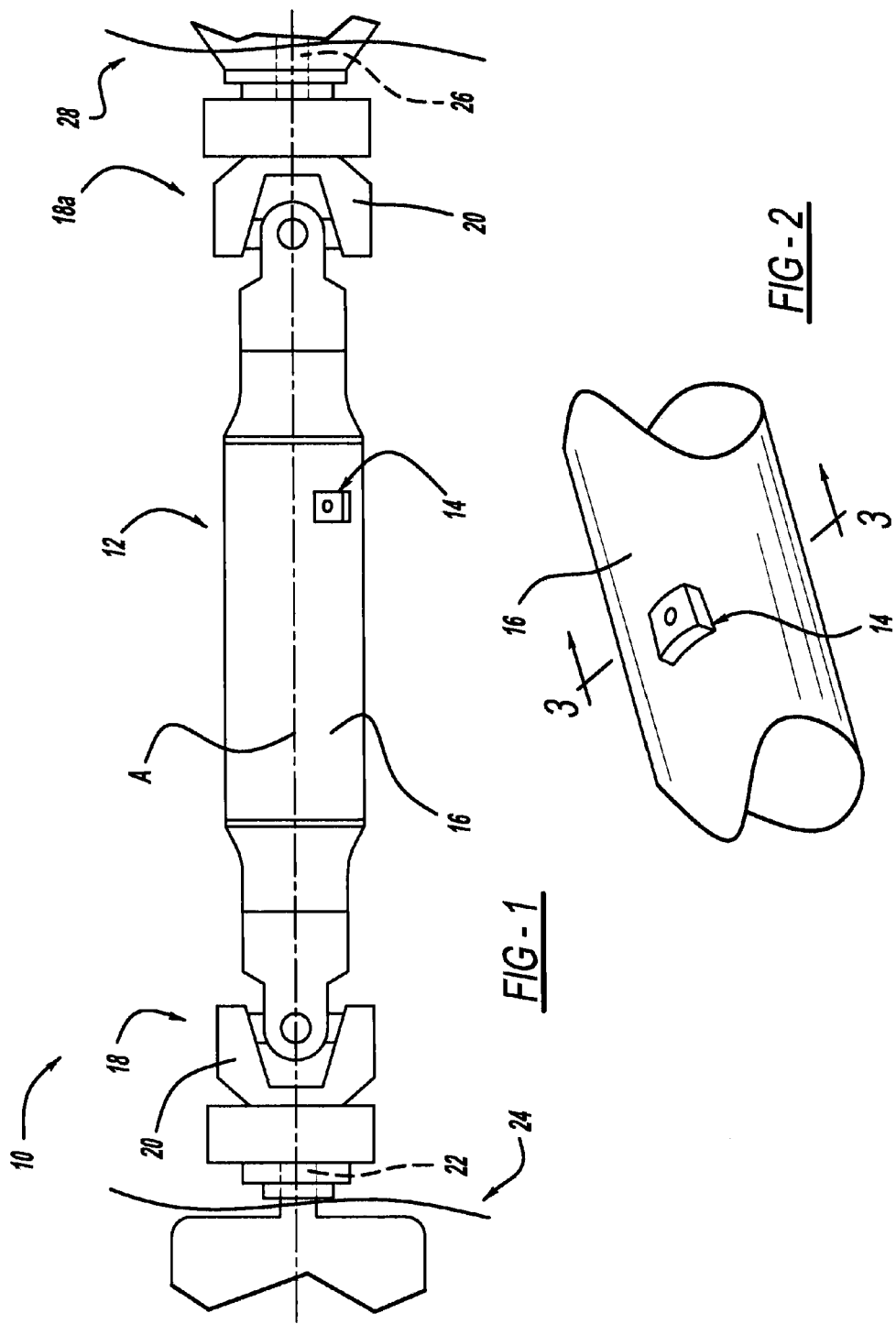
FIG. 1 is a side elevation view of an exemplary drive train assembly having a composite weight constructed in accordance with the teachings of the present disclosure.
FIG. 2 is a perspective view of a portion of the driveshaft assembly of FIG. 1 illustrating the attachment of the composite weight to the shaft member of the driveshaft assembly in more detail.

With reference to FIG. 1 of the drawings, an exemplary driveshaft assembly 10 can include a driveshaft 12 and a composite weight 14 that is constructed in accordance with the teachings of the present disclosure. The driveshaft 12 can be conventional in its construction and as such, a detailed discussion of the driveshaft 12 need not be provided herein. Briefly, the driveshaft 12 can include a shaft member 16 and a pair of universal joints, such as cardan joints 18. The shaft member 16 can be formed of a tubular material, such as aluminum (e.g., 6160 aluminum). Each of the cardan joints 18 can have a first side, which can be fixedly coupled to an associated end of the shaft member 16, and a second side that can be coupled in an appropriate manner to a driving or driven component. In the particular example provided, the cardan joint 18 employs a spline yoke 20, which is non-rotatably but axially slidably coupled to an output shaft 22 of a transmission 24, while the cardan joint 18a is fixedly mounted to an input pinion 26 associated with an axle assembly 28.

With reference to FIGS. 2-5, the composite weight 14 can include a body portion 30 that can be made of a first material and an insert 32 of a second material that can be different than from the first material. The first material can be selected to be compatible with the material from which the shaft member 16 is formed and in the particular example provided, is aluminum. The body portion 30 can have any desired shape, but in the illustrated example the body portion has a generally rectangular shape with an arcuate lower surface 34 and an arcuate upper surface 36 that can be concentric with the arcuate lower surface 34. The arcuate lower surface 34 can be defined by a first radius R1 that can be equal to or larger than a second radius R2 that can define an outer circumferential surface 38 of the shaft member 16. The body portion 30 can include a mounting aperture 40 that can be employed for mounting the composite weight 14 to the shaft member 16. In the particular example provided, the mounting aperture 40 includes a counterbore 42, which intersects the arcuate upper surface 36, and a through hole 44 that intersects the counterbore 42 and the arcuate lower surface 34.

Figure 6:
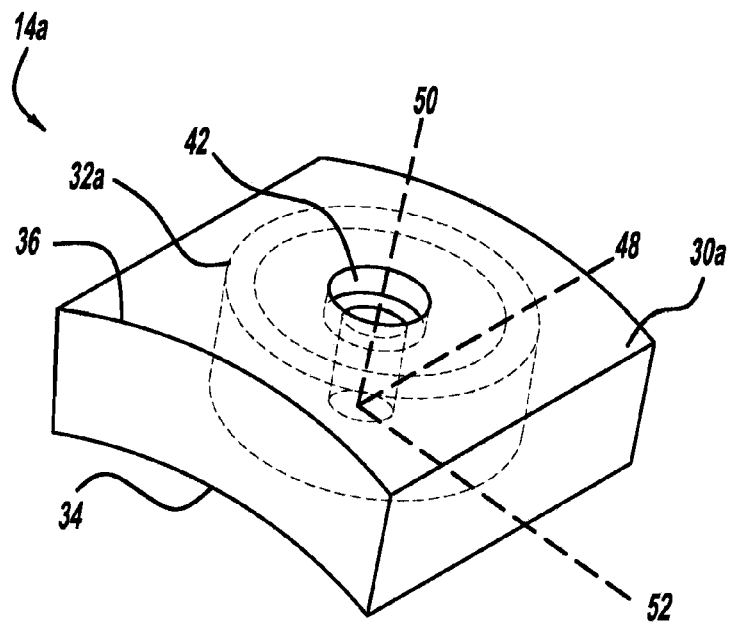
FIG. 6 is a perspective view of a composite weight with an annular ring insert according to the present disclosure.

The second material that forms the insert 32 can be relatively more dense than the first material that makes up the body portion 30. In the example provided, the second material is a steel. In situations where the second material has a higher melting point than the first material, the insert may be cast into the first material such the insert 32 is fully or partly encapsulated by the body portion 30. In the embodiment described herein, the insert 32 comprises two discrete plate members 46 (FIGS. 4 and 5) that are oriented symmetrically about a first axis 48 that is perpendicular to a longitudinal axis 50 of the mounting aperture 40. The plate members 46 can also be oriented symmetrically about a second axis 52 that is orthogonal to the first axis 48 and the longitudinal axis 50 of the mounting aperture 40. The plate members 46 can be positioned in a mold (not shown) and the first material that forms the body portion 30 can be molded onto the plate members 46 in a suitable casting process, such as die casting or sand casting, so as to at least partly encapsulate the insert 32 in the body portion 30. Features of the insert 32 and/or the mold can be employed to control the position of the insert 32 within the body portion 30. It will be appreciated, however, that the insert 32 may be sized and shaped as desired and that it may alternatively comprise three or more discrete elements or a single element, such as shown in FIG. 6. Also alternatively, the insert 32 can be fastened (e.g., chemically, adhesively or mechanically, such as through crimping or an interference fit) to the body portion 30. The insert 32 can have a desired size, shape and mass according to specific needs.

A suitable attachment means can be employed to secure the composite weight 14 to the shaft member 16. For example, the body portion 30 of the composite weight 14 can be welded (e.g., MIG welded, laser welded, resistance welded) or adhesively bonded to the shaft member 16. In the particular example provided, a suitable weld material 54 is delivered through a typical welding operation to thereby fixedly secure the balanced weight 14 at a desired location on the shaft member 16 to reduce an out-of-balance condition in the driveshaft 12 (FIG. 1).

Figure 7:
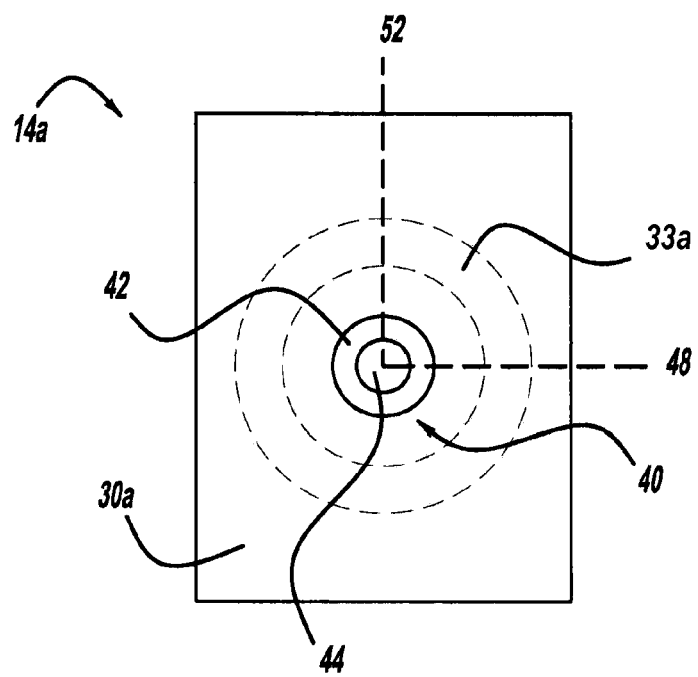
FIG. 7 is a top cross-section view of a composite weight with an annular ring insert according to the present disclosure.

FIGS. 6-7 illustrate an alternately constructed composite weight 14a with an annular ring shaped insert 32a. The insert 32a can be positioned within the body portion 30a of the composite weight 14a concentrically about the mounting aperture 40. The insert 32a can be disposed symmetrically about both first axis 48 and second axis 52.

Prior to installation of the balance weight 14, the driveshaft 12 can be rotated about a longitudinal axis A (FIG. 1) of the shaft member 16. The balance weight 14 can be selected (e.g., based on its mass) and located on the shaft member 16 at a location that is selected to reduce a rotational imbalance or out-of-balance condition of the driveshaft 12. The balance weight 14 can be secured to the shaft member 16 via a suitable attachment means. For example, the body portion 30 of the balance weight 14 can be welded (e.g., MIG welded, laser welded, resistance welded) or adhesively bonded to the shaft member 16 to thereby fixedly secure the balanced weight 14 at a desired location on the shaft member 16 to reduce an out-of-balance condition in the driveshaft 12 (FIG. 1).

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein, even if not specifically shown or described, so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A composite weight for balancing a driveshaft, the driveshaft having a tubular member that is defined by a first radius, the composite weight comprising:
   an insert formed of a first material and having a predetermined mass; and
   a body portion formed of a second material that is different from the first material, the body portion being molded over and encasing the insert, the body portion having a surface that is configured to abut the tubular member, the surface being at least partially defined by a second radius that is equal to or greater than the first radius;
   wherein the second material is aluminum and wherein the first material has a density that is greater than a density of the second material.

2. The composite weight of claim 1, wherein the insert is formed of steel.

3. The composite weight of claim 1, wherein the insert is comprised of a plurality of insert members.

4. The composite weight of claim 1, wherein a counterbore is formed in the body portion.

5. The composite weight of claim 4, wherein the insert is disposed symmetrically about a first axis, the first axis intersecting a longitudinal axis of the counterbore.

6. The composite weight of claim 5, wherein the insert comprises a pair of plate members that are disposed on opposite sides of the first axis.

7. The composite weight of claim 5, wherein the insert is disposed symmetrically about a second axis, the second axis being orthogonal to the longitudinal axis of the counterbore and the first axis.

8. The composite weight of claim 7, wherein the insert is an annular structure that is disposed concentrically about the counterbore.

9. A balanced driveshaft assembly comprising:
   a driveshaft having a shaft member and a pair of cardan joints that are coupled to the opposite ends of the shaft member, the shaft member being formed of a first material; and
   a composite weight fixed to the shaft member, the composite weight having an insert that is formed of a second material that is denser than the first material, the composite weight also having a body that is formed of the first material, the insert being encapsulated in the material that forms the body.

10. The balanced driveshaft assembly of claim 9, wherein the first material is aluminum.

11. The balanced driveshaft assembly of claim 10, wherein the second material is steel.

12. The balanced driveshaft assembly of claim 10, wherein the insert comprises a plurality of insert members.

13. The balanced driveshaft assembly of claim 9, wherein the shaft member has an outer surface that is defined by a first radius and wherein the composite weight has an abutting surface that abuts the outer surface of the shaft member, the abutting surface being defined by a second radius that is greater than or equal to the first radius.

14. The balanced driveshaft assembly of claim 9, wherein a counterbore is formed in the body and a welding material is fitted through the counterbore and fixedly mounted to the shaft member.

15. The balanced driveshaft assembly of claim 14, wherein the insert is disposed symmetrically about a first axis, the first axis intersecting a longitudinal axis of the counterbore.

16. The balanced driveshaft assembly of claim 15, wherein the insert comprises a pair of plate members that are disposed on opposite sides of the first axis.

17. The balanced driveshaft assembly of claim 15, wherein the insert is disposed symmetrically about a second axis, the second axis being orthogonal to the longitudinal axis of the counterbore and the first axis.

18. The balanced driveshaft assembly of claim 17, wherein the insert is an annular structure that is disposed concentrically about the counterbore.

19. A balanced driveshaft assembly, comprising:
a driveshaft having a tubular shaft member made from a first material and defining an arcuate outer surface;
a composite weight adapted to be fixed to the shaft member, the composite weight including a body and an insert, the body is made from a first material and the insert is made from a second material that is different than the first material, the body includes a mounting aperture that communicates with an arcuate inner surface configured to abut the arcuate outer surface of the shaft member such that the body engages the shaft member, the insert including first and second insert members located on opposite sides of the mounting aperture and which are at least partially encapsulated within the body; and
attachment means disposed within the mounting aperture for securing the body to the shaft member.

20. The balanced driveshaft assembly of claim 19 wherein the inserts are made from the second material that is denser than the first material of the body.

21. The balanced driveshaft assembly of claim 19 wherein the first and second insert members are connected to define an annular insert that is disposed concentrically about the mounting aperture.

* * * * *